Sept. 25, 1956　　　C. J. KLEIN ET AL　　　2,764,473
APPARATUS FOR DETINNING SCRAP
Filed June 23, 1952　　　　　　　　　　　　5 Sheets-Sheet 1

INVENTOR.
CLARENCE J. KLEIN
WILBERT H. WRIGHT
BY
ATTORNEY.

Sept. 25, 1956     C. J. KLEIN ET AL     2,764,473
APPARATUS FOR DETINNING SCRAP
Filed June 23, 1952                      5 Sheets-Sheet 2
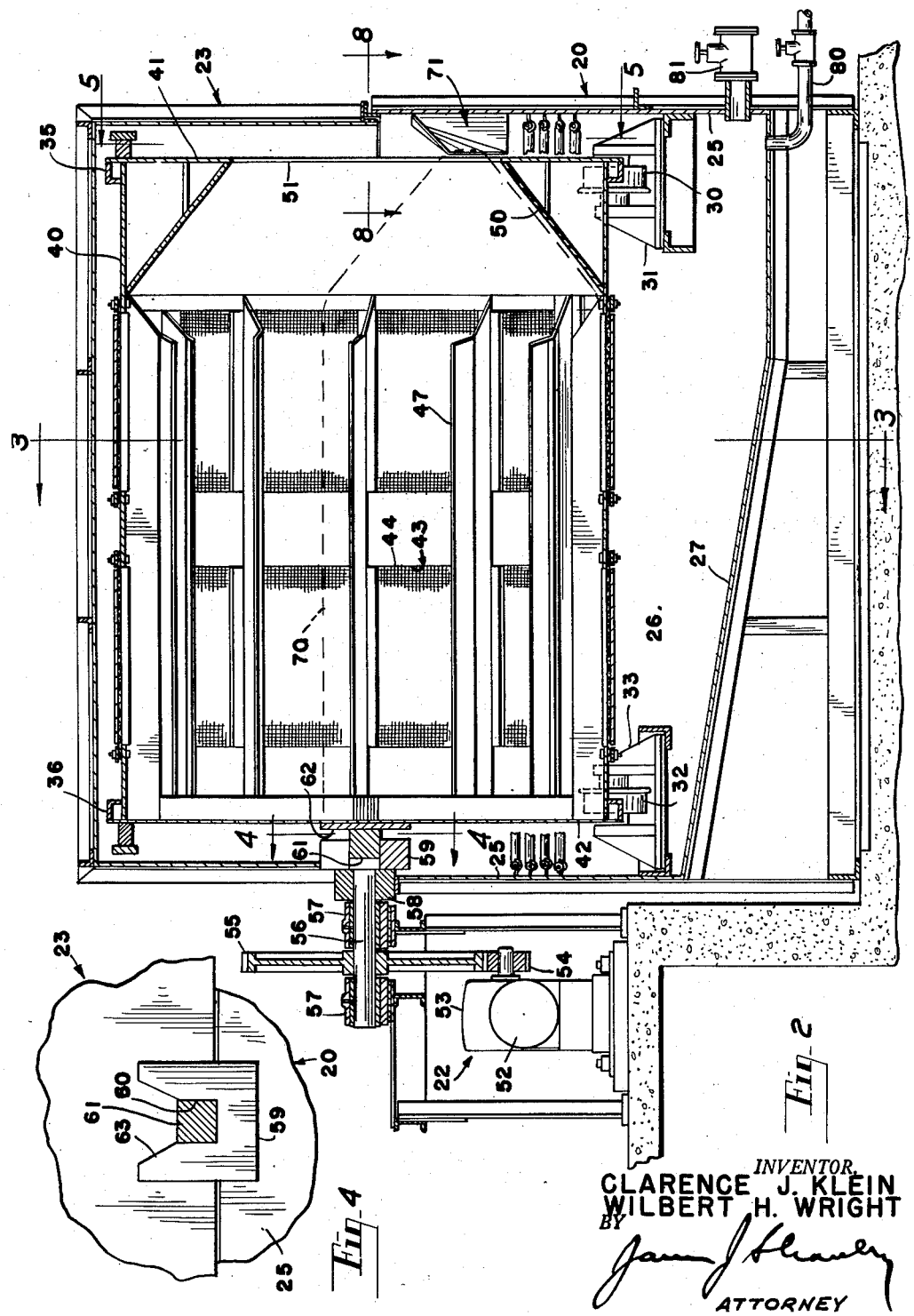
INVENTOR
CLARENCE J. KLEIN
WILBERT H. WRIGHT
BY
ATTORNEY

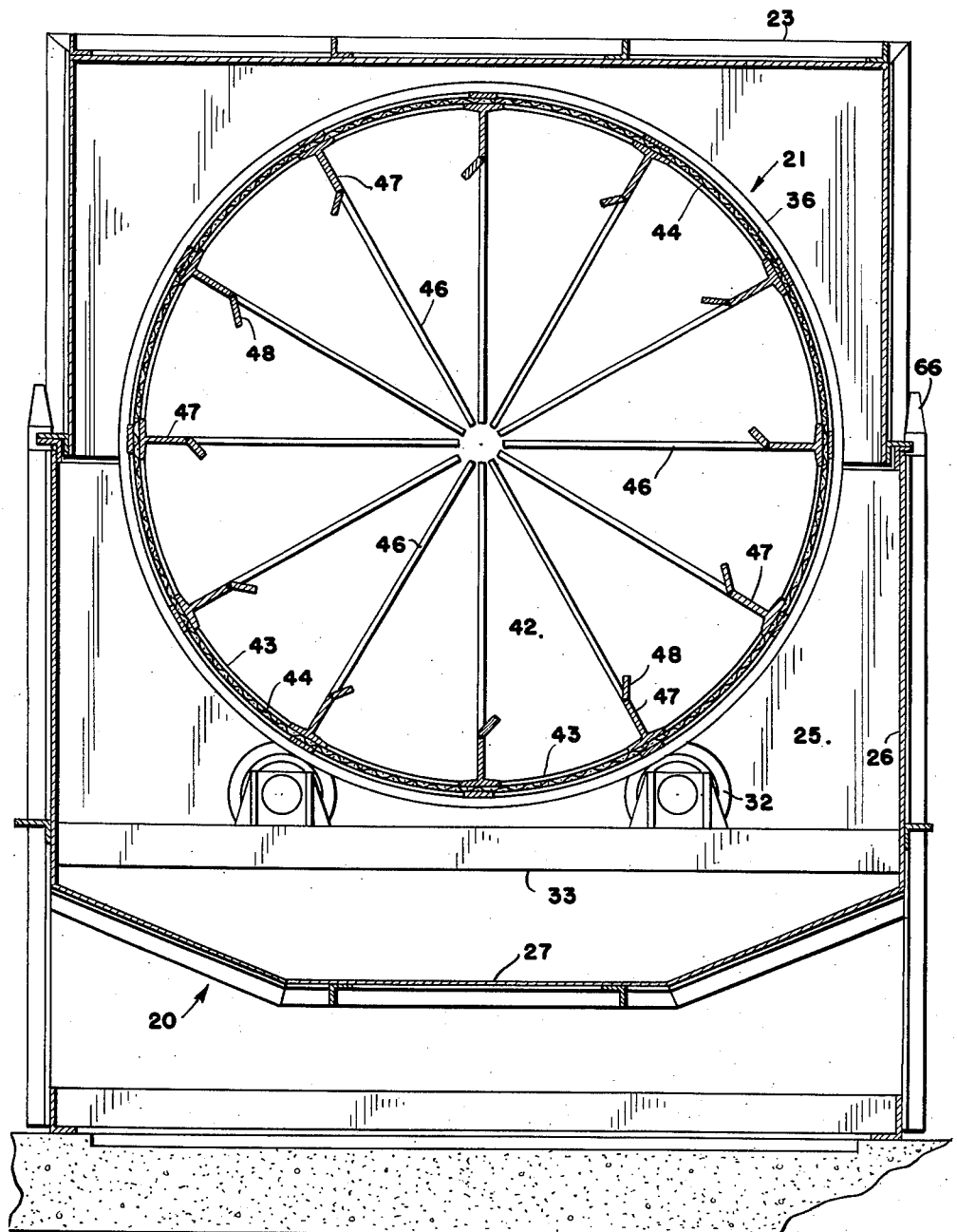

Sept. 25, 1956  C. J. KLEIN ET AL  2,764,473
APPARATUS FOR DETINNING SCRAP
Filed June 23, 1952  5 Sheets-Sheet 4
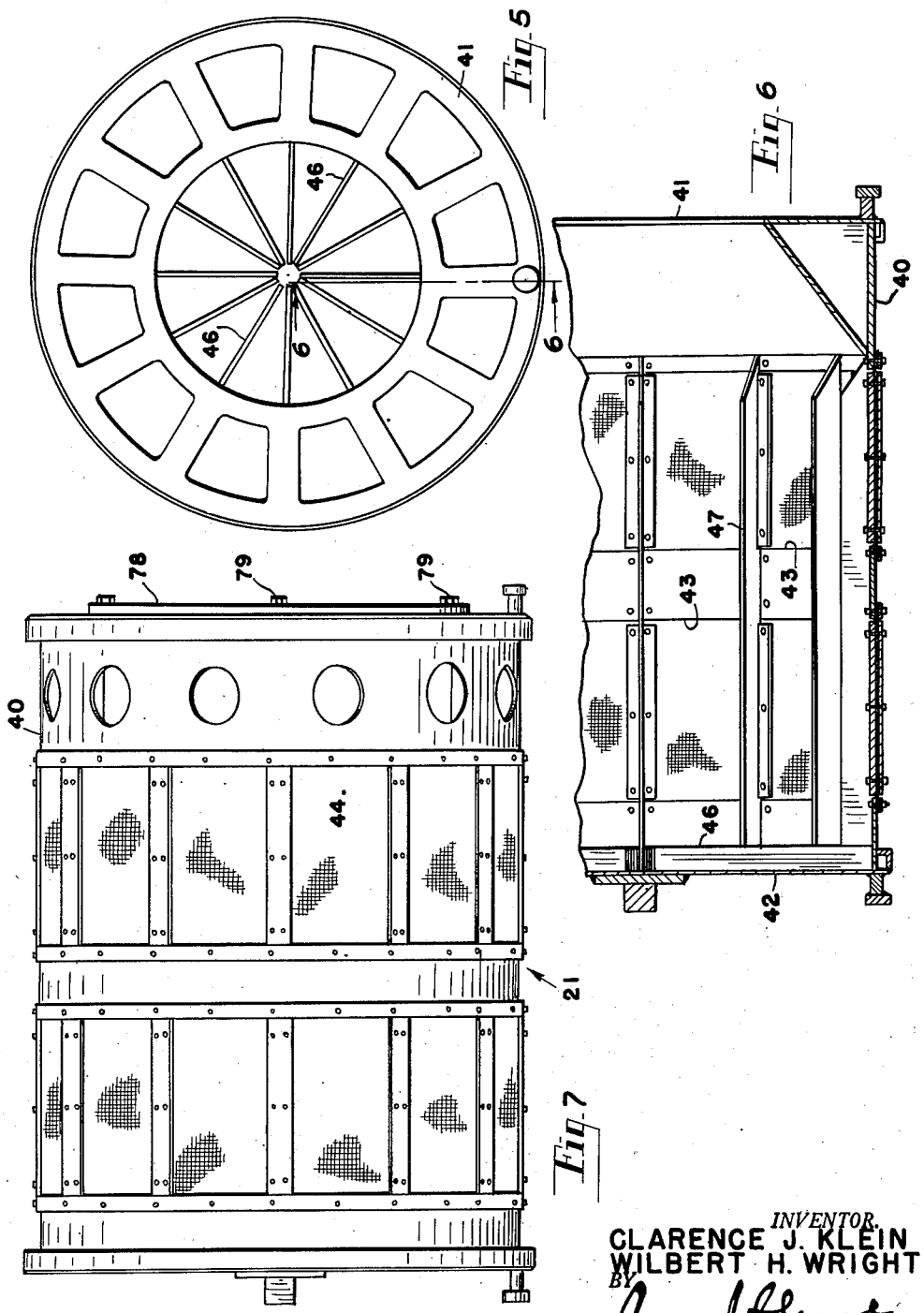
INVENTOR.
CLARENCE J. KLEIN
WILBERT H. WRIGHT
BY
ATTORNEY.

Sept. 25, 1956    C. J. KLEIN ET AL    2,764,473
APPARATUS FOR DETINNING SCRAP
Filed June 23, 1952    5 Sheets-Sheet 5
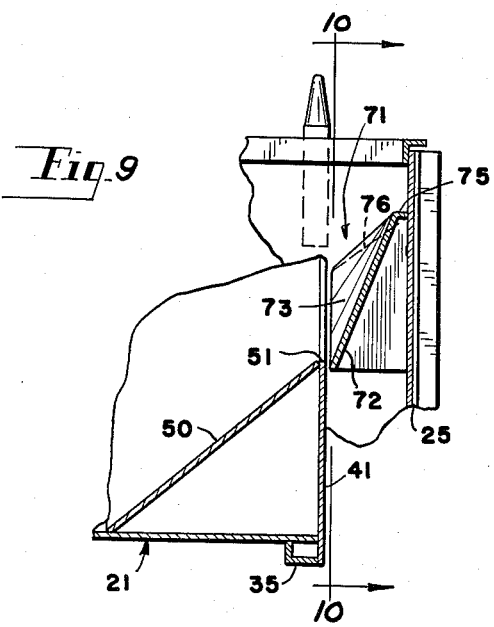
Fig. 9
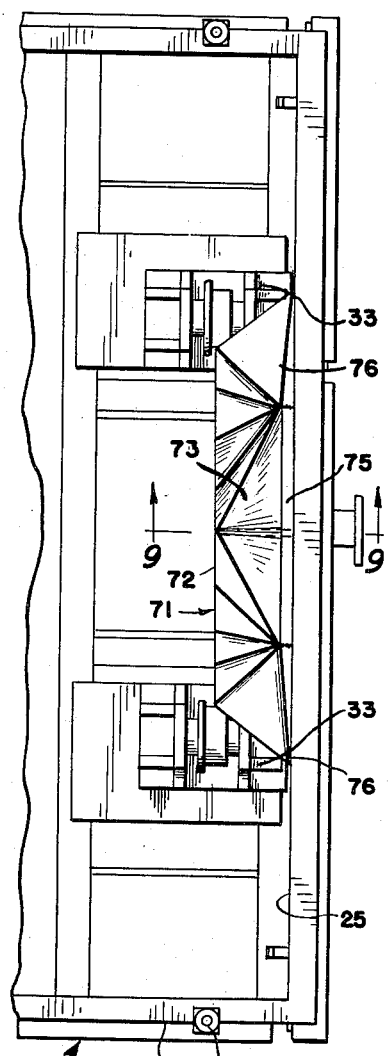
Fig. 8
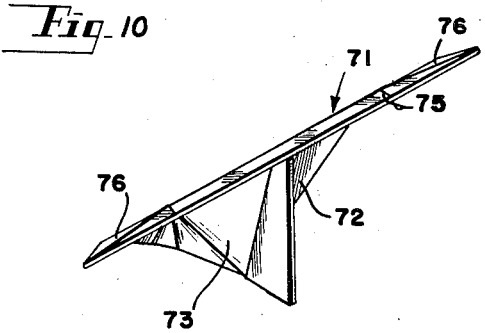
Fig. 10
Fig. 11
INVENTOR.
CLARENCE J. KLEIN
WILBERT H. WRIGHT
BY
ATTORNEY.

United States Patent Office 2,764,473
Patented Sept. 25, 1956

2,764,473
APPARATUS FOR DETINNING SCRAP

Clarence J. Klein, Marland Heights, and Wilbert H. Wright, Weirton, W. Va., assignors to National Steel Corporation, a corporation of Delaware Application June 23, 1952, Serial No. 295,108

7 Claims. (Cl. 23—269)

The present invention primarily relates to an improved apparatus for detinning scrap tinplate by tumbling the scrap in a chemical bath which chemically dissolves and removes the tin.

While the present apparatus will be described more particularly in connection with chemically treating scrap tinplate to remove the tin, the present apparatus is not limited to such material and may be used for treating other materials.

Tinplate is produced commercially in large quantities by both the hot dip process and the electrolytic process. In the hot dip process, the base metal, for example sheets of blackplate, are passed through a bath of molten tin to coat the base metal sheets with a coating of tin. In the electrolytic process, base metal, usually in the form of strip, is electrolytically plated with tin. Fairly large quantities of scrap tinplate are produced in both types of process. Some of this scrap tinplate is in the form of imperfect, relatively large sheets. In the electrolytic process, large quantities of ribbon-like scrap tinplate are produced as a result of the necessity of trimming the edges. This is usually done by continuously passing the electrolytic strip tinplate through trimmers which sever a continuous band from each edge of the strip. Preferably, these bands are wound on mandrels to form bales in which the ribbons of tinplate are haphazardly entwined.

Tin is scarce and valuable and the scrap tinplate is a waste material containing a large quantity of tin and steel. While the total quantity of tin present on the scrap is large, the quantity of tin on a percentage basis is low, and in order to economically recover the tin, the apparatus for removing the tin must be capable of readily and economically handling and treating large quantities of scrap with a minimum of maintenance being required.

It is an object of the present invention to provide an improved apparatus for treating material in a chemical bath.

Another object of the present invention is to provide an improved apparatus for tumbling scrap tinplate in a chemical bath to chemically remove the tin.

Another object of the present invention is to provide an improved apparatus for treating tumbling scrap tinplate that includes a rotatable, scrap holding drum and novel means for supporting and rotating the drum.

Another object of the present invention is to provide an improved apparatus for treating scrap pieces of tinplate in a rotating drum having an open end that includes novel means for preventing the scrap from falling out of the opening and for preparing the scrap so that it can be more readily discharged through the opening after treatment.

The objects and advantages of the present invention will become more apparent from the following detailed description, taken with the accompanying drawings, in which:

Figure 2 is a sectional view taken along line 2—2 of Figure 1;

Figure 3 is a sectional view taken along line 3—3 of Figure 2;

Figure 4 is an enlarged fragmentary sectional view taken along line 4—4 of Figure 2;

Figure 5 is an end view of the drum forming part of the apparatus of Figure 1;

Figure 6 is a fragmentary sectional view taken along line 6—6 of Figure 5;

Figure 7 is a side view of the drum of Figure 5;

Figure 8 is a fragmentary plan view taken along line 8—8 of Figure 2;

Figure 9 is an enlarged fragmentary sectional view taken along line 9—9 of Figure 8;

Figure 10 is a fragmentary view taken along line 10—10 of Figure 9; and,

Figure 11 is an isometric view of the deflector shown in Figures 8, 9 and 10.

Figure 1:
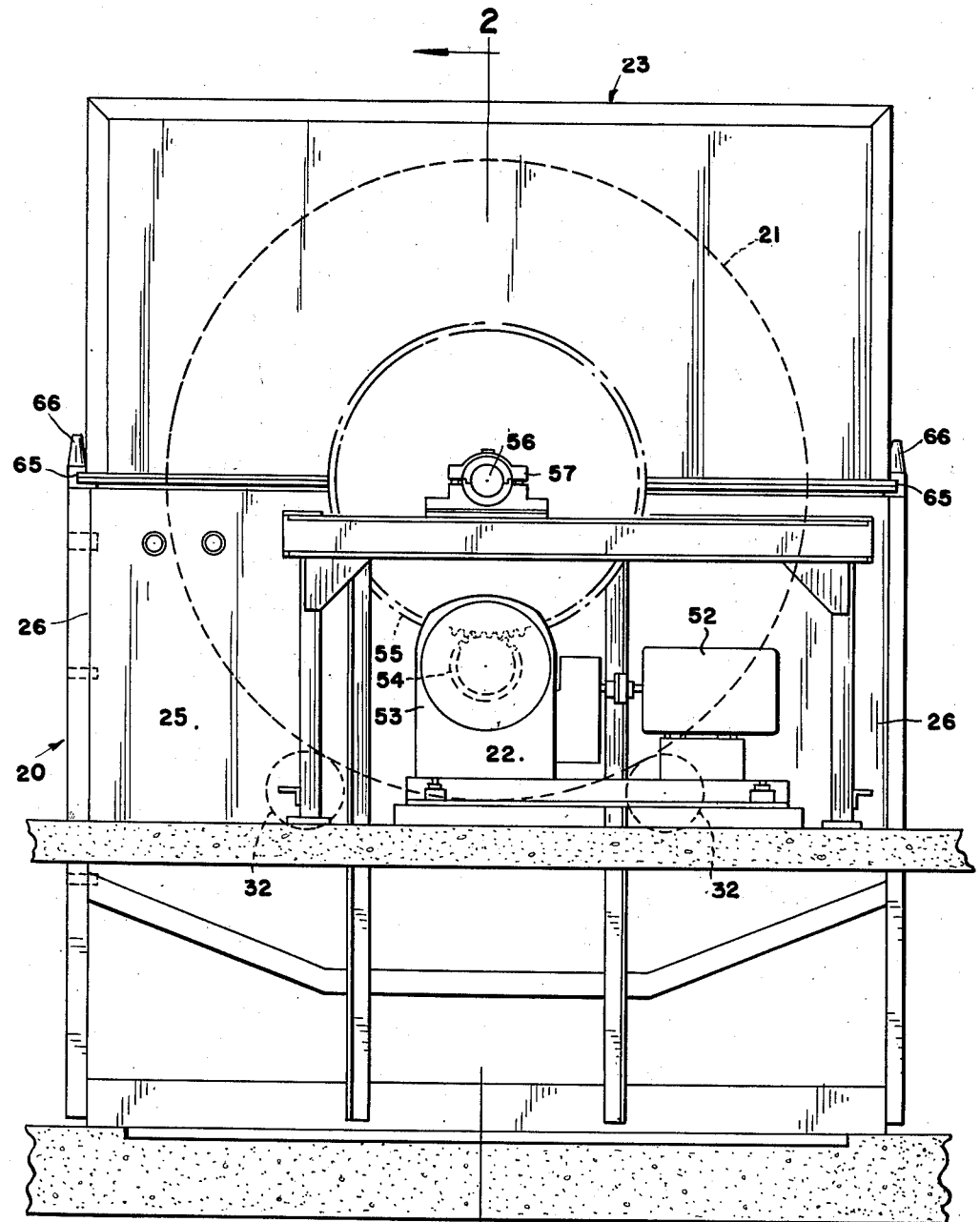
Figure 1 is an end view in elevation of apparatus embodying the principles of the present invention.

Referring to the drawings, the detinning apparatus includes a tank 20 in which there is rotatably mounted an elongated drum 21 adapted to hold scrap tinplate and to tumble the scrap tinplate in a chemical bath confined in tank 20. Power actuated means 22 is provided for rotating the drum and the tank preferably is provided with a cover 23, so that the tank 20 and cover 23 together completely enclose the drum 21 and the bath in the tank.

The tank 20 includes upwardly extending, spaced apart end walls 25, upwardly extending, spaced apart side walls 26 and a bottom wall 27 preferably inclined downwardly toward one end of the tank for reasons more fully hereinafter described.

Means are provided in the tank 20 for rotatably supporting the drum. At the front end of the tank, a pair of flanged rolls 30 are rotatably supported on the framework 31. At the opposite end of the tank, a pair of similar flanged rolls or wheels 32 are rotatably supported on the framework 33. Rails 35 and 36 encircle the opposite ends of the drum 21, and these rails ride on the rolls 30 and 32, respectively, so that the drum can be readily rotated about its longitudinal axis. The flanges on rolls 30 and 32 retain the rails 35 and 36 on the rolls. Other means may be provided for maintaining the rails on the rolls.

Referring more particularly to Figures 2, 3 and 5 to 7, the drum 21 includes a substantially cylindrical body 40 having a reinforcing plate 41 at the front end and a plate 42 at the opposite or back end. Two series of openings 43 extend around the periphery of the drum and these openings are covered with strips of relatively fine screening 44 so that the detinning bath in the tank can freely circulate through the drum and the contents therein. Preferably, a series of radially arranged vanes 46 are provided on plate 42 to reinforce the drum and to enhance the tumbling action. In addition, a series of vanes 47 are spaced apart about the periphery of the drum with each vane extending longitudinally of the drum and extending inwardly from the outer periphery of the drum and toward the center of the drum. Preferably, each vane 47 is provided with an inner strip 48 extending along its inner edge with the strip 48 being inclined to the plane of vane 47 to additionally enhance the tumbling of the material as the drum is rotated.

At the forward end of the drum, there is a peripherally extending member 50 which extends about the forward end portion of the drum and extends diagonally inwardly from the outer peripheral wall 40 of the drum to the end plate 41 of the drum so as to form a substantially frusto-conical spout portion extending back from a discharge opening 51 in the end of the drum to facilitate the discharge of material from the drum through the opening 51.

As shown more clearly in Figures 1 and 2, the power actuated drive means 22 includes an electric motor 52 coupled to a gear reduction 53 which drives a pinion gear 54. The pinion gear 54 meshes with a large spur gear 55 mounted on and connected to drive shaft 56 supported in bearings 57. On the end of shaft 56, there is mounted a collar 58 to which there is fastened, as by welding, a member 59 containing a straight sided socket 60. As shown, the socket 60 is substantially rectangular in cross section. The socket 60 receives a similarly shaped straight sided plug 61 connected to a plate 62 mounted on the back end plate 40 of the drum 21. The shaft 56, the socket member 59 and plug 61 are aligned with the longitudinal axis of the drum. Thus, when the motor 52 is energized, the shaft 56 and the drum 21 are rotated.

As shown more clearly in Figure 4, the socket member 59 containing the straight sided socket 60 includes an upwardly divergent opening 63 which opens upwardly from the socket 60. When a drum is to be removed from the tank or is to be placed in the tank, the motor 52 is stopped so that the socket 60 opens upwardly. The drum 21 can be moved vertically upward to move plug 61 out of the socket 60. Similarly, when a drum is placed in the tank, the drum is lowered onto the rolls 30 and 32 and at the same time plug 61 is lowered into socket 60 through the throat or opening 63. The flared sides of throat 63 guide plug 61 into the socket 60. Thus, the drum can be readily and rapidly placed in the tank or removed from the tank.

The cover 23 includes a lower lip 65 extending about its periphery. Tapered or pointed posts 66 extend upwardly at spaced points around the top of the tank and the lower lip 65 of the cover 26 is adapted to fit the posts 65 so that when the tank cover 23 is lowered into position, the posts 66 will engage the cover and guide the cover into position.

Referring more particularly to Figures 8, 10 and 11, inclusive, the present apparatus primarily is intended for detinning a quantity of scrap tinplate which consists of or contains a relatively large quantity of relatively thin elongated ribbons of tinplate. As the tank is rotated, these lengths of ribbon tend to become entwined and form an elongated rod-like mass in the bottom of the tank that rolls across the vanes or baffles. Such a mass is shown at 70, Figure 2. The longitudinal axis of this rod-like member of scrap is below the longitudinal axis of the drum but at least at times will be above the lower edge of the opening 51. Rotation of the drum causes the mass 70 to roll, and as this continues, the mass is elongated and may protrude out of the drum through the opening 51 and may tend to fall out of the drum. In addition, the mass 70 becomes more and more entwined so that it may be difficult to discharge the mass through the opening 51 when the drum or cylinder 21 is removed from the tank and turned with end 41 down. The scrap may tend to jam at the end of the drum and not fall freely out through the opening.

Referring particularly to Figures 2 and 8 to 11, means 71 is provided in the tank 20 adjacent the opening 51 for preventing scrap from falling out of the drum 21 when the drum rotates in the tank, and this means is also constructed and arranged to aid in pointing the forward end of the mass 70 of entwined scrap so that the mass can be discharged more readily through the opening 51 when the drum is removed from the tank and turned with end 41 down. The scrap retaining and pointing means 71 includes a member 72 mounted on tank wall 25. The member 72 may be formed by shaping a piece of sheet metal or may be formed in any other suitable manner. As shown, the member 72 extends across the lower portion of opening 51. The midportion 73 of member 72 encircles and extends upwardly and outwardly from the lower peripheral edge of opening 51. Preferably, the mid-portion 73 is tapered, as shown, so that it not only extends upwardly and outwardly from the lower portion of the opening but its ends are also inclined toward the extended axis of rotation of drum 21. With this arrangement, the portion 73 engages the mass of scrap 70 and prevents the scrap from falling downwardly between the end of the drum and the tank wall. In addition, the portion 73, which preferably is concave both longitudinally and transversely, rounds or points the end of the mass of scrap. The mass of scrap having a rounded or pointed end can be more readily discharged through the opening 51. The portion or wall 50 which encircles the forward portion of the drum and which extends inwardly from cylindrical wall 40 to the opening 51 in end wall 41 also aids in pointing or rounding the end of the mass 70. With both portions 50 and 73 being present, the rounded or pointed end of the mass of scrap will extend back along a greater length of the mass than if only member 73 were present. The scrap retainer 72 forms a smaller point or end on the rod-like mass 70 than would the wall 50 alone, although wall 50 would produce some rounding of the end of the mass. The frusto-conical portion 50 also aids in guiding the mass of scrap through the opening 51.

The member 72 may be attached to the wall 25 in any suitable manner. As shown, a portion of member 72 is turned outwardly to provide a reinforcing lip 75. The ends of member 72 have been slit and welded together to form reinforcing portions 76. The member 72 is connected to wall 25 by welding along the outer edge of lip 75 and the outer edges of end portions 76.

At times, the mass of scrap material may consist of or contain relatively larger flat pieces of sheet material. For example, the scrap may include relatively large sheets of tinplate or portions of such sheets so that the scrap material will not become entwined to form a rod-like mass but will retain, at least to a limited extent, its original loose character. Under such conditions, it may be desirable to attach a cover 78 to the end of drum 21 by means of bolts 79 as shown in Figure 7 to cover opening 51. When a cover 78 is used, the pointing and retaining means 71 may be omitted.

The scrap treating solution in tank 20 may be of any suitable type and for tinplate may be, for example, an aqueous solution of sodium hydroxide and sodium nitrate. Preferably, the bottom wall slopes downwardly to a valved outlet pipe 80 so that the resulting tin containing solution can be periodically withdrawn. When there is a tendency for tin containing salts, for example sodium stannate, to precipitate, the precipitate will collect in the low portion and will be swept out the outlet when the tank is emptied. The tank may be connected to a suitable source of bath liquid through a valved inlet 81.

A cycle of operations will be described assuming that no drum 21 is in tank 20 and that socket 60 is positioned with opening 63 opening upwardly. The drum 21 may be filled with scrap tinplate in any suitable manner or may be filled by means of the charging apparatus shown and described in application Serial No. 290,734, filed May 29, 1952, by J. M. Bendot, and now abandoned. After the scrap has been placed in drum 21, the drum 21 is lowered into the tank 20 by means of a crane, not shown, and the drum rails 35 and 36 engage rolls 30 and 32. Also, the plug 61 engages socket 60. The cover 23 may then be placed on the tank and the motor 52 started to rotate the drum and tumble the scrap in the solution in the tank. As the drum rotates, the retaining means 71 prevents the scrap from falling out of the drum and then points the scrap as previously described. After the tin has been removed from the scrap, the motor 52 is stopped with socket 60 opening upwardly, the cover is removed and the drum is lifted out of the tank and the tank is emptied by upending the tank so that opening 51 is positioned downwardly. Thereafter, the cycle of operations may be repeated.

We claim:

1. Apparatus for treating material comprising, in combination, tank means adapted to hold a bath of solution for treating the material, an elongated drum adapted to hold the material, means supporting the drum in the tank means for rotation about the longitudinal axis of the drum, the drum including a substantially cylindrical side wall and spaced apart end walls, the end walls of the drum being spaced from the tank means, means forming a circular discharge opening centrally disposed in one of the end walls, the circular discharge opening having a diameter less than the diameter of the drum, a conical wall positioned in the drum and extending from the side wall of the drum inwardly to the one end wall of the drum adjacent the periphery of the discharge opening, drive means for rotating the drum in the tank means and means mounted on the tank means and extending across at least the lower portion of the discharge opening and bridging the space between the one end wall of the drum and the tank means for preventing material from falling out of the drum through the discharge opening and down between the one end wall of the drum and the tank means.

2. Apparatus for treating material comprising, in combination, tank means adapted to hold a bath of solution for treating the material, an elongated material holding drum supported in the tank means for rotation about the longitudinal axis of the drum for tumbling the material in the bath, the drum including an end wall with a circular discharge opening centrally disposed in the end wall, the end wall of the drum being spaced from the tank means, drive means for rotating the drum in the tank means, and material retaining means mounted in the tank means and extending across at least the lower portion of the opening and bridging the space between the end wall of the drum and the tank means for preventing material from falling out of the drum through the opening and down between the end of the drum and the tank means.

3. Apparatus for treating material comprising, in combination, tank means adapted to hold a bath of solution for treating material, an elongated material holding drum supported in the tank means for rotation about the longitudinal axis of the drum for tumbling the material in the bath, the drum including an end wall with a circular discharge opening centrally disposed in the end wall, drive means for rotating the drum in the tank means, and material retaining means mounted in the tank means and extending across at least the lower portion of the opening for preventing material from falling out of the drum through the opening and down between the end of the drum and the tank means, the material retaining means including a wall extending about the lower portion of the opening and extending outwardly and upwardly from the lower peripheral edge portion of the opening whereby a mass of material extending out of the drum through the opening is pointed by the wall upon rotation of the drum.

4. Apparatus for treating material comprising, in combination, tank means adapted to hold a bath of solution for treating material, an elongated material holding drum supported in the tank means for rotation about the longitudinal axis of the drum for tumbling the material in the bath, the drum including an end wall with a circular discharge opening centrally disposed in the end wall, drive means for rotating the drum in the tank means, and material retaining means mounted in the tank means and extending across at least the lower portion of the opening for preventing material from falling out of the drum through the opening and down between the end of the drum and the tank means, the material retaining means including a wall extending about the lower portion of the opening and extending upwardly and outwardly from the lower peripheral edge portion of the opening with the wall being substantially concave both transversely and longitudinally thereof whereby a mass of material extending out of the drum and through the lower portion of the opening is pointed during rotation of the drum.

5. Apparatus for treating material comprising, in combination, tank means adapted to hold a bath of liquid for treating the material, an elongated drum for holding the material, the drum being supported in the tank means for rotation about the longitudinal axis of the drum and including a substantially cylindrical side wall and spaced apart end walls, means forming a circular discharge opening centrally disposed in one end wall, a guide wall extending about the interior of one end of the drum and extending from the side wall inwardly to said one end wall adjacent the periphery of the discharge opening, drive means for rotating the drum in the tank means, and material retaining means mounted in the tank means and extending across the lower portion of the opening, the material retaining means including a pointing wall extending about the periphery of the lower portion of the opening and extending upwardly and outwardly from the periphery of the lower portion of the opening and extending inwardly toward the extended longitudinal axis of the drum whereby a mass of material extending out of the drum and through the lower portion of the opening engages the pointing wall and is pointed during rotation of the drum.

6. Apparatus for treating material comprising, in combination, tank means adapted to hold a bath of solution for treating the material, an elongated drum adapted to hold a mass of material for treatment, the drum being supported in the tank means for rotation about the longitudinal axis of the drum and including a substantially cylindrical side wall and spaced apart end walls, drive means for rotating the tank in the tank means to tumble the material in the bath, means forming a circular discharge opening centrally disposed in one end wall, a substantially frusto-conical wall at one end of the drum extending from the cylindrical side wall inwardly to the periphery of the discharge opening, retaining means mounted in the tank means, the retaining means including a wall extending about the periphery of the lower portion of the discharge opening and extending outwardly from the periphery of the lower portion of the opening and being concave both transversely and longitudinally thereof.

7. Apparatus for treating material comprising, in combination, tank means adapted to hold a bath of solution for treating the material, an elongated material-holding drum having encircling rail means supported on rotatable rollers in the tank means whereby the drum is rotatable about the longitudinal axis of the drum for tumbling the material in the bath, the drum including a substantially cylindrical side wall and spaced apart oppositely positioned first and second end walls, drive means for rotating the drum including a drive shaft at one end of the tank means, a socket member connected to the drive shaft and including a socket, a plug member connected to the first end wall of the drum and fitting the socket whereby rotation of the drive shaft rotates the drum, an opening in the socket member extending laterally upwardly from the socket whereby the drum can be lifted out of the tank means and the plug lifted out of the socket through the opening in the socket member, a circular discharge opening centrally disposed in the second end wall, a substantially frusto-conical wall extending about the drum and extending from the side wall inwardly to the second end wall and terminating adjacent the periphery of the discharge opening, and material retaining means mounted in the tank means including a wall extending across at least the lower portion of the opening and extending outwardly and upwardly from the lower peripheral edge of the opening whereby the mass of material in the drum when extending through the opening against the wall is pointed by the wall on rotation of the drum.

(References on following page)

References Cited in the file of this patent

UNITED STATES PATENTS

| | | | |
|---|---|---|---|
| 135,578 | Panton | Feb. 4, | 1873 |
| 706,334 | Moore | Aug. 5, | 1902 |
| 883,211 | Leitch | Mar. 31, | 1908 |
| 963,186 | Trump | July 5, | 1910 |
| 1,375,624 | Bartels | Apr. 19, | 1921 |
| 2,096,090 | De Lape | Oct. 19, | 1937 |
| 2,390,388 | Rector | Dec. 4, | 1945 |

FOREIGN PATENTS

| | | |
|---|---|---|
| 16,895 | Great Britain | 1908 |